US012791182B2

(12) United States Patent
Brite et al.

(10) Patent No.: US 12,791,182 B2
(45) Date of Patent: Nov. 10, 2026

(54) COVE LIGHT FIXTURE WITH HIDDEN INTEGRATED AIR RETURN

(71) Applicant: Integrated Illumination Systems, Inc., Morris, CT (US)

(72) Inventors: Jeffrey Brite, Wantagh, NY (US); Mark Alphonse Zampini, Watertown, CT (US)

(73) Assignee: Integrated Illumination Systems, Inc.

( * ) Notice: Subject to any disclaimer, the term of this patent is extended or adjusted under 35 U.S.C. 154(b) by 0 days.

(21) Appl. No.: 19/205,520

(22) Filed: May 12, 2025

(65) Prior Publication Data

US 2025/0271133 A1 Aug. 28, 2025

Related U.S. Application Data

(63) Continuation of application No. 18/442,490, filed on Feb. 15, 2024, now Pat. No. 12,297,996.

(60) Provisional application No. 63/446,205, filed on Feb. 16, 2023.

(51) Int. Cl.

| | |
|---|---|
| ***F21V 33/00*** | (2006.01) |
| ***F21S 8/00*** | (2006.01) |
| ***F21V 29/67*** | (2015.01) |
| ***F24F 7/007*** | (2006.01) |

(52) U.S. Cl.

CPC .......... *F21V 33/0092* (2013.01); *F21S 8/037* (2013.01); *F21V 29/677* (2015.01); *F24F 7/007* (2013.01); *F24F 2221/02* (2013.01)

(58) Field of Classification Search

CPC ............. F21V 33/0088; F21V 33/0092; F21V 29/677; F24F 7/007; F21S 8/037

USPC ................................ 362/547, 147, 294, 373

See application file for complete search history.

(56) References Cited

U.S. PATENT DOCUMENTS

| | | | | |
|---|---|---|---|---|
| 2,810,823 | A | 10/1957 | Guth, Jr. | |
| 3,560,729 | A | 2/1971 | Liberman | |
| 3,688,105 | A * | 8/1972 | Governale | F24C 7/081 219/220 |
| 3,796,870 | A | 3/1974 | Pettyjohn, Jr. | |
| 4,139,770 | A | 2/1979 | Beyersdorf | |
| 5,264,997 | A | 11/1993 | Hutchisson et al. | |
| 5,465,199 | A | 11/1995 | Bray et al. | |
| 5,561,346 | A | 10/1996 | Byrne | |

(Continued)

FOREIGN PATENT DOCUMENTS

WO WO-03/017733 A1 2/2003

OTHER PUBLICATIONS

Application Note AN-944, "Use Gate Charge to Design the Gate Drive Circuit for Power MOSFETs and IGBTs," International Rectifier, 2001, 5 pages.

(Continued)

*Primary Examiner* — Thomas M Sember

(74) *Attorney, Agent, or Firm* — Foley & Lardner LLP

(57) ABSTRACT

A cove light fixture with a hidden integrated air return is provided. The cove lighting structure can include a return air structure comprising a vent configured to receive return air. The cove lighting structure can include a cove structure connected with a platform extended laterally from the return air structure. The cove lighting structure can include a light fixture comprising a light source configured to provide cove lighting. The light fixture can be positioned above the platform and between the cove structure and the return air structure.

20 Claims, 5 Drawing Sheets

(56) References Cited

U.S. PATENT DOCUMENTS

| | | | |
|---|---|---|---|
| 5,783,909 | A | 7/1998 | Hochstein |
| 5,909,429 | A | 6/1999 | Satyanarayana et al. |
| 5,947,587 | A | 9/1999 | Keuper et al. |
| 6,013,988 | A | 1/2000 | Bucks et al. |
| 6,016,038 | A | 1/2000 | Mueller et al. |
| 6,040,663 | A | 3/2000 | Bucks et al. |
| 6,094,014 | A | 7/2000 | Bucks et al. |
| 6,127,783 | A | 10/2000 | Pashley et al. |
| 6,147,458 | A | 11/2000 | Bucks et al. |
| 6,150,774 | A | 11/2000 | Mueller et al. |
| 6,157,093 | A | 12/2000 | Giannopoulos et al. |
| 6,166,496 | A | 12/2000 | Lys et al. |
| 6,194,839 | B1 | 2/2001 | Chang |
| 6,201,353 | B1 | 3/2001 | Chang et al. |
| 6,211,626 | B1 | 4/2001 | Lys et al. |
| 6,234,645 | B1 | 5/2001 | Borner et al. |
| 6,234,648 | B1 | 5/2001 | Borner et al. |
| 6,236,331 | B1 | 5/2001 | Dussureault |
| 6,238,065 | B1 | 5/2001 | Jones |
| 6,249,088 | B1 | 6/2001 | Chang |
| 6,250,774 | B1 | 6/2001 | Begemann et al. |
| 6,253,530 | B1 | 7/2001 | Price et al. |
| 6,288,497 | B1 | 9/2001 | Chang et al. |
| 6,292,901 | B1 | 9/2001 | Lys et al. |
| 6,299,329 | B1 | 10/2001 | Mui et al. |
| 6,304,464 | B1 | 10/2001 | Jacobs et al. |
| 6,305,818 | B1 | 10/2001 | Lebens et al. |
| 6,340,864 | B1 | 1/2002 | Wacyk |
| 6,340,868 | B1 | 1/2002 | Lys et al. |
| 6,384,545 | B1 | 5/2002 | Lau |
| 6,411,046 | B1 | 6/2002 | Muthu |
| 6,441,558 | B1 | 8/2002 | Muthu et al. |
| 6,443,592 | B1 | 9/2002 | Unger et al. |
| 6,445,139 | B1 | 9/2002 | Marshall et al. |
| 6,459,919 | B1 | 10/2002 | Lys et al. |
| 6,489,731 | B1 | 12/2002 | Bruning et al. |
| 6,495,964 | B1 | 12/2002 | Muthu et al. |
| 6,497,840 | B1 * | 12/2002 | Palestro .................... A61L 9/20 422/4 |
| 6,507,158 | B1 | 1/2003 | Wang |
| 6,507,159 | B2 | 1/2003 | Muthu |
| 6,510,995 | B2 | 1/2003 | Muthu et al. |
| 6,513,949 | B1 | 2/2003 | Marshall et al. |
| 6,528,954 | B1 | 3/2003 | Lys et al. |
| 6,552,495 | B1 | 4/2003 | Chang |
| 6,576,881 | B2 | 6/2003 | Muthu et al. |
| 6,577,080 | B2 | 6/2003 | Lys et al. |
| 6,577,512 | B2 | 6/2003 | Tripathi et al. |
| 6,580,309 | B2 | 6/2003 | Jacobs et al. |
| 6,586,890 | B2 | 7/2003 | Min et al. |
| 6,596,977 | B2 | 7/2003 | Muthu et al. |
| 6,608,453 | B2 | 8/2003 | Morgan et al. |
| 6,609,813 | B1 | 8/2003 | Showers et al. |
| 6,617,795 | B2 | 9/2003 | Bruning |
| 6,621,235 | B2 | 9/2003 | Chang |
| 6,630,801 | B2 | 10/2003 | Schuurmans |
| 6,636,003 | B2 | 10/2003 | Rahm et al. |
| 6,639,368 | B2 | 10/2003 | Sheoghong |
| 6,676,284 | B1 | 1/2004 | Wynne Willson |
| 6,692,136 | B2 | 2/2004 | Marshall et al. |
| 6,720,745 | B2 | 4/2004 | Lys et al. |
| 6,724,159 | B2 | 4/2004 | Gutta et al. |
| 6,734,639 | B2 | 5/2004 | Chang et al. |
| 6,741,351 | B2 | 5/2004 | Marshall et al. |
| 6,762,562 | B2 | 7/2004 | Leong |
| 6,777,891 | B2 | 8/2004 | Lys et al. |
| 6,788,011 | B2 | 9/2004 | Mueller et al. |
| 6,796,680 | B1 | 9/2004 | Showers et al. |
| 6,796,686 | B2 | 9/2004 | Jacob et al. |
| 6,801,003 | B2 | 10/2004 | Schanberger et al. |
| 6,806,659 | B1 | 10/2004 | Mueller et al. |
| 6,831,569 | B2 | 12/2004 | Wang et al. |
| 6,853,150 | B2 | 2/2005 | Clauberg et al. |
| 6,853,151 | B2 | 2/2005 | Leong et al. |
| 6,859,644 | B2 | 2/2005 | Wang |
| 6,922,022 | B2 | 7/2005 | Bucks et al. |
| 6,930,452 | B2 | 8/2005 | De Krijger et al. |
| 6,932,477 | B2 | 8/2005 | Stanton |
| 6,933,685 | B2 | 8/2005 | Gutta et al. |
| 6,933,767 | B2 | 8/2005 | Bucks et al. |
| 6,965,205 | B2 | 11/2005 | Piepgras et al. |
| 6,969,954 | B2 | 11/2005 | Lys |
| 6,972,525 | B2 | 12/2005 | Bucks et al. |
| 6,975,079 | B2 | 12/2005 | Lys et al. |
| 6,992,803 | B2 | 1/2006 | Chang |
| 6,998,594 | B2 | 2/2006 | Gaines et al. |
| 7,014,336 | B1 | 3/2006 | Ducharme et al. |
| 7,030,572 | B2 | 4/2006 | Nijhof et al. |
| 7,031,920 | B2 | 4/2006 | Dowling et al. |
| 7,038,398 | B1 | 5/2006 | Lys et al. |
| 7,038,399 | B2 | 5/2006 | Lys et al. |
| 7,064,498 | B2 | 6/2006 | Dowling et al. |
| 7,067,992 | B2 | 6/2006 | Leong et al. |
| 7,071,762 | B2 | 7/2006 | Xu et al. |
| 7,113,541 | B1 | 9/2006 | Lys et al. |
| 7,118,248 | B2 | 10/2006 | Wynne Willson |
| 7,132,804 | B2 | 11/2006 | Lys et al. |
| 7,135,824 | B2 | 11/2006 | Lys et al. |
| 7,139,617 | B1 | 11/2006 | Morgan et al. |
| 7,140,752 | B2 | 11/2006 | Ashdown |
| 7,161,311 | B2 | 1/2007 | Mueller et al. |
| 7,161,313 | B2 | 1/2007 | Piepgras et al. |
| 7,161,556 | B2 | 1/2007 | Morgan et al. |
| 7,178,941 | B2 | 2/2007 | Roberge et al. |
| 7,180,252 | B2 | 2/2007 | Lys et al. |
| 7,186,003 | B2 | 3/2007 | Dowling et al. |
| 7,202,608 | B2 | 4/2007 | Robinson et al. |
| 7,202,613 | B2 | 4/2007 | Morgan et al. |
| 7,202,641 | B2 | 4/2007 | Claessens et al. |
| 7,204,622 | B2 | 4/2007 | Dowling et al. |
| 7,221,104 | B2 | 5/2007 | Lys et al. |
| 7,228,190 | B2 | 6/2007 | Dowling et al. |
| 7,231,060 | B2 | 6/2007 | Dowling et al. |
| 7,233,115 | B2 | 6/2007 | Lys |
| 7,233,831 | B2 | 6/2007 | Blackwell |
| 7,242,152 | B2 | 7/2007 | Dowling et al. |
| 7,253,566 | B2 | 8/2007 | Lys et al. |
| 7,255,457 | B2 | 8/2007 | Ducharme et al. |
| 7,255,458 | B2 | 8/2007 | Ashdown |
| 7,256,554 | B2 | 8/2007 | Lys |
| 7,262,559 | B2 | 8/2007 | Tripathi et al. |
| 7,267,461 | B2 | 9/2007 | Kan et al. |
| 7,274,160 | B2 | 9/2007 | Mueller et al. |
| 7,300,192 | B2 | 11/2007 | Mueller et al. |
| 7,308,296 | B2 | 12/2007 | Lys et al. |
| 7,309,965 | B2 | 12/2007 | Dowling et al. |
| 7,314,289 | B2 | 1/2008 | Montagne |
| 7,319,298 | B2 | 1/2008 | Jungwirth et al. |
| 7,323,676 | B2 | 1/2008 | Duijve |
| 7,329,998 | B2 | 2/2008 | Jungwirth |
| 7,350,936 | B2 | 4/2008 | Ducharme et al. |
| 7,352,138 | B2 | 4/2008 | Lys et al. |
| 7,352,339 | B2 | 4/2008 | Morgan et al. |
| 7,353,071 | B2 | 4/2008 | Blackwell et al. |
| 7,354,172 | B2 | 4/2008 | Chemel et al. |
| 7,358,679 | B2 | 4/2008 | Lys et al. |
| 7,358,681 | B2 | 4/2008 | Robinson et al. |
| 7,358,706 | B2 | 4/2008 | Lys |
| 7,358,929 | B2 | 4/2008 | Mueller et al. |
| 7,358,961 | B2 | 4/2008 | Zwanenburg |
| 7,387,405 | B2 | 6/2008 | Ducharme et al. |
| 7,388,665 | B2 | 6/2008 | Ashdown |
| 7,394,210 | B2 | 7/2008 | Ashdown |
| 7,420,335 | B2 | 9/2008 | Robinson et al. |
| 7,423,387 | B2 | 9/2008 | Robinson et al. |
| 7,432,668 | B2 | 10/2008 | Zwanenburg et al. |
| 7,443,209 | B2 | 10/2008 | Chang |
| 7,449,847 | B2 | 11/2008 | Schanberger et al. |
| 7,453,217 | B2 | 11/2008 | Lys et al. |
| 7,459,864 | B2 | 12/2008 | Lys |
| 7,462,997 | B2 | 12/2008 | Mueller et al. |
| 7,463,070 | B2 | 12/2008 | Wessels |
| 7,482,565 | B2 | 1/2009 | Morgan et al. |
| 7,482,760 | B2 | 1/2009 | Jungwirth et al. |

(56) References Cited

U.S. PATENT DOCUMENTS 7,490,953 B2 2/2009 Holten et al.
7,490,957 B2 2/2009 Leong et al.
7,495,671 B2 2/2009 Chemel et al.
7,502,034 B2 3/2009 Chemel et al.
7,505,395 B2 3/2009 Ashdown et al.
7,507,001 B2 3/2009 Kit
7,511,436 B2 3/2009 Xu
7,511,437 B2 3/2009 Lys et al.
7,515,128 B2 4/2009 Dowling
7,520,634 B2 4/2009 Ducharme et al.
7,521,872 B2 4/2009 Bruning
7,538,499 B2 5/2009 Ashdown
7,542,257 B2 6/2009 Mccormick et al.
7,550,931 B2 6/2009 Lys et al.
7,550,935 B2 6/2009 Lys et al.
7,557,521 B2 7/2009 Lys
7,569,807 B2 8/2009 Matheson
7,572,028 B2 8/2009 Mueller et al.
7,573,209 B2 8/2009 Ashdown et al.
7,573,210 B2 8/2009 Ashdown et al.
7,573,729 B2 8/2009 Elferich et al.
7,598,681 B2 10/2009 Lys et al.
7,598,684 B2 10/2009 Lys et al.
7,598,686 B2 10/2009 Lys et al.
7,619,370 B2 11/2009 Chemel et al.
7,652,236 B2 1/2010 Cortenraad et al.
7,654,703 B2 2/2010 Kan et al.
7,656,366 B2 2/2010 Ashdown
7,658,506 B2 2/2010 Dowling
7,659,673 B2 2/2010 Lys
7,659,674 B2 2/2010 Mueller et al.
7,665,883 B2 2/2010 Matheson
7,667,409 B2 2/2010 Geerts et al.
7,675,238 B2 3/2010 Cortenraad et al.
7,687,753 B2 3/2010 Ashdown
7,688,002 B2 3/2010 Ashdown et al.
7,689,130 B2 3/2010 Ashdown
7,703,951 B2 4/2010 Piepgras et al.
7,710,369 B2 5/2010 Dowling
7,712,926 B2 5/2010 Matheson
7,714,521 B2 5/2010 Qian
7,731,387 B2 6/2010 Cortenraad et al.
7,731,389 B2 6/2010 Draganov et al.
7,731,390 B2 6/2010 Van Gorkom et al.
7,737,643 B2 6/2010 Lys
7,738,002 B2 6/2010 Ashdown et al.
7,740,375 B2 6/2010 Zou et al.
7,766,489 B2 8/2010 Duine et al.
7,766,518 B2 8/2010 Piepgras et al.
7,772,787 B2 8/2010 Ashdown et al.
7,777,427 B2 8/2010 Stalker, III
7,781,979 B2 8/2010 Lys
7,802,902 B2 9/2010 Moss et al.
7,806,558 B2 10/2010 Williamson
7,808,191 B2 10/2010 Wu
7,809,448 B2 10/2010 Lys et al.
7,810,974 B2 10/2010 Van Rijswick et al.
7,845,823 B2 12/2010 Mueller et al.
7,850,347 B2 12/2010 Speier et al.
7,854,539 B2 12/2010 Van Duijneveldt
7,868,562 B2 1/2011 Salsbury et al.
7,878,683 B2 2/2011 Logan et al.
7,878,688 B2 2/2011 Paulussen et al.
7,893,631 B2 2/2011 Speier
7,893,661 B2 2/2011 Ackermann et al.
7,894,050 B2 2/2011 Ashdown et al.
7,906,917 B2 3/2011 Tripathi et al.
7,911,151 B2 3/2011 Xu
7,914,173 B2 3/2011 Paulussen et al.
7,946,747 B2 5/2011 Kim et al.
8,022,632 B2 9/2011 Schulz et al.
8,026,673 B2 9/2011 Lys
8,844,608 B2 * 9/2014 Kimura .............. F24F 1/00075 165/53
2002/0074559 A1 6/2002 Dowling et al.
2003/0132721 A1 7/2003 Jacobs et al.
2003/0133292 A1 7/2003 Mueller et al.
2004/0052076 A1 3/2004 Mueller et al.
2004/0090191 A1 5/2004 Mueller et al.
2004/0178751 A1 9/2004 Mueller et al.
2005/0236998 A1 10/2005 Mueller et al.
2005/0275626 A1 12/2005 Mueller et al.
2006/0002110 A1 1/2006 Dowling et al.
2006/0076908 A1 4/2006 Morgan et al.
2006/0104066 A1 5/2006 Cini et al.
2006/0114201 A1 6/2006 Chang
2006/0152172 A9 7/2006 Mueller et al.
2006/0221606 A1 10/2006 Dowling
2006/0262521 A1 11/2006 Piepgras et al.
2006/0274526 A1 12/2006 Weston et al.
2006/0290624 A1 12/2006 Ashdown
2007/0063658 A1 3/2007 Van Der Veeken
2007/0086912 A1 4/2007 Dowling et al.
2007/0115658 A1 5/2007 Mueller et al.
2007/0145915 A1 6/2007 Roberge et al.
2007/0153514 A1 7/2007 Dowling et al.
2007/0230159 A1 10/2007 Cortenraad et al.
2007/0258240 A1 11/2007 Ducharme et al.
2007/0273290 A1 11/2007 Ashdown et al.
2008/0042599 A1 2/2008 Ashdown
2008/0043464 A1 2/2008 Ashdown
2008/0048582 A1 2/2008 Robinson
2008/0062413 A1 3/2008 Ashdown et al.
2008/0089060 A1 4/2008 Kondo et al.
2008/0094005 A1 4/2008 Rabiner et al.
2008/0122386 A1 5/2008 De Brouwer et al.
2008/0136331 A1 6/2008 Schmeikal
2008/0136796 A1 6/2008 Dowling
2008/0140231 A1 6/2008 Blackwell et al.
2008/0164826 A1 7/2008 Lys
2008/0164854 A1 7/2008 Lys
2008/0167734 A1 7/2008 Robinson et al.
2008/0183081 A1 7/2008 Lys et al.
2008/0239675 A1 10/2008 Speier
2008/0265797 A1 10/2008 Van Doorn
2008/0278092 A1 11/2008 Lys et al.
2008/0278941 A1 11/2008 Logan et al.
2008/0285271 A1 11/2008 Roberge et al.
2008/0290251 A1 11/2008 Deurenberg et al.
2008/0297066 A1 12/2008 Meijer et al.
2008/0298330 A1 12/2008 Leitch
2008/0315798 A1 12/2008 Diederiks et al.
2009/0002981 A1 1/2009 Knibbe
2009/0021175 A1 1/2009 Wendt et al.
2009/0021182 A1 1/2009 Sauerlaender
2009/0072761 A1 3/2009 Wessels
2009/0128059 A1 5/2009 Joosen et al.
2009/0134817 A1 5/2009 Jurngwirth et al.
2009/0160364 A1 6/2009 Ackermann et al.
2009/0168415 A1 7/2009 Franciscus Deurenberg et al.
2009/0179587 A1 7/2009 Van Der Veen et al.
2009/0179596 A1 7/2009 Willaert et al.
2009/0189448 A1 7/2009 Verschueren
2009/0224695 A1 9/2009 Van Erp et al.
2009/0230884 A1 9/2009 Van Doorn
2009/0243507 A1 10/2009 Lucero-Vera et al.
2009/0278473 A1 11/2009 Van Erp
2009/0284174 A1 11/2009 Sauerlander et al.
2009/0321666 A1 12/2009 Hilgers
2010/0007600 A1 1/2010 Deurenberg et al.
2010/0026191 A1 2/2010 Radermacher et al.
2010/0045478 A1 2/2010 Schulz et al.
2010/0072901 A1 3/2010 De Rijck et al.
2010/0072902 A1 3/2010 Wendt et al.
2010/0079085 A1 4/2010 Wendt et al.
2010/0079091 A1 4/2010 Deixler et al.
2010/0084995 A1 4/2010 Baaijens et al.
2010/0091488 A1 4/2010 Ijzerman et al.
2010/0094439 A1 4/2010 Van De Meulenhof et al.
2010/0102732 A1 4/2010 Peeters et al.
2010/0117543 A1 5/2010 Van Der Veen et al.
2010/0117656 A1 5/2010 Snelten
2010/0118531 A1 5/2010 Montagne
2010/0127633 A1 5/2010 Geerts et al.

(56) References Cited

U.S. PATENT DOCUMENTS

| | | | |
|---|---|---|---|
| 2010/0134041 | A1 | 6/2010 | Radermacher et al. |
| 2010/0134042 | A1 | 6/2010 | Willaert |
| 2010/0148689 | A1 | 6/2010 | Morgan et al. |
| 2010/0164399 | A1 | 7/2010 | Radermacher et al. |
| 2010/0165618 | A1 | 7/2010 | Vissenberg et al. |
| 2010/0171771 | A1 | 7/2010 | Otte et al. |
| 2010/0181936 | A1 | 7/2010 | Radermacher et al. |
| 2010/0188007 | A1 | 7/2010 | Deppe et al. |
| 2010/0194293 | A1 | 8/2010 | Deurenberg et al. |
| 2010/0231133 | A1 | 9/2010 | Lys |
| 2010/0231363 | A1 | 9/2010 | Knibbe |
| 2010/0244707 | A1 | 9/2010 | Gaines et al. |
| 2010/0244734 | A1 | 9/2010 | Van Herpen et al. |
| 2010/0259182 | A1 | 10/2010 | Man et al. |
| 2010/0264834 | A1 | 10/2010 | Gaines et al. |
| 2010/0271843 | A1 | 10/2010 | Holten et al. |
| 2010/0289532 | A1 | 11/2010 | Wendt et al. |
| 2010/0301780 | A1 | 12/2010 | Vinkenvleugel |
| 2010/0308745 | A1 | 12/2010 | Delnoij |
| 2011/0025205 | A1 | 2/2011 | Van Rijswick et al. |
| 2011/0025230 | A1 | 2/2011 | Schulz et al. |
| 2011/0035404 | A1 | 2/2011 | Morgan et al. |
| 2011/0042554 | A1 | 2/2011 | Hilgers et al. |
| 2011/0090684 | A1 | 4/2011 | Logan et al. |
| 2011/0095694 | A1 | 4/2011 | Justel et al. |
| 2011/0285292 | A1 | 11/2011 | Mollnow et al. |
| 2011/0291812 | A1 | 12/2011 | Verbrugh |
| 2012/0019670 | A1 | 1/2012 | Chang et al. |
| 2017/0321877 | A1 | 11/2017 | Polidoro |
| 2021/0325011 | A1* | 10/2021 | Chokshi ................ F21V 17/164 |

OTHER PUBLICATIONS

ATAVRFBKIT/EVLB001 User Guide, "Dimmable Fluorescent Ballast", ATMEL, 2007, 35 pages.
Barberis, C., "Precision current sink costs less than $20," EDN Design Ideas, vol. 43, No. 6, Mar. 13, 1998, 2 pages.
Bellcomb Technologies Incorporated, "Edges, Joiners, Attachments," retrieved from http://www.bellcomb.com/caps/edges.htm, Apr. 22, 2007, 3 pages.
Bookmarks Menu, "Controllers / Wireless," Dec. 6, 2012, 1 page.
Bowling, S., "Buck-Boost LED Driver Using the PIC16F785 MCU," Microchip, 2006, 12 pages.
By Staff—Consulting-Specifying Engineer, "DALI Delivers Control and Cost Savings, Headaches Too," Consulting-Specifying Engineer, Jun. 1, 2002, 2 pages.
Canny, D., "Controlling slew times tames EMI in offline supplies", EDN Design Ideas, Nov. 14, 2002.
Control Freak, "Addict Data," Creative Lighting, 2008, 5 pages.
Curtis, K., "High Power IR LED Driver Using the PIC16C781/782," Microchip, 2002, 8 pages.
CybroTech, "Managing Lights with Dali," Cybrotech Ltd., 2007, 11 pages.
Cypress Perform, "Implementing an Integrated DMX512 Receiver," Cypress Semiconductor Corporation, Dec. 16, 2009, 1 page.
Cypress Perform, "PowerPSoC (R) Intelligent LED Driver," Cypress Semiconductor Corporation, Jul. 20, 2009, 52 pages.
Dali, "Dali at work," News & Events, Apr. 8, 2010, 1 page.
Dali, "Dali-Protocol," Davmark Group, 2007, 6 pages.
Davidovic et al., "Lead-Acid Battery Charger Becomes a Subfunction in a Microcontroller," The Authority on Emerging Technologies for Design Solutions, Mar. 29, 2007, 2 pages.
Di Jasio, L., "A Technique to Increase the Frequency Resolution of PICmicro MCU PWM Modules," Microchip, 2006, 10 pages.
Dietz et al., "Very Low-Cost Sensing and Communication Using Bidirectional LEDs," Mitsubishi Electric Research Laboratories, Jul. 2003, 19 pages.
Distler, T., "LED Effects Stream TM v2.0 Protocol (Revision C)," Jun. 2, 2005, 5 pages.
Dunn, J., "Matching MOSFET Drivers to MOSEFTs," Microchip, 2004, 10 pages.
Fosler et al., "Digitally Addressable DALI Dimming Ballast," Microchip, 2002, 18 pages.
Fosler, R., "The RS-232/DALI Bridge Interface," Microchip, 2002, 8 pages.
Fosler, R., "Use a microcontroller to design a boost converter," EDN design ideas, Mar. 4, 2004, pp. 74-75.
Ghulyani, L., "Simple MPPT-Based Lead Acid Charger Using bq2031," Texas Instruments, Dec. 3, 2009, 5 pages.
Goder, D., "Scheme provides high-side current sensing for white-LED drivers," EDN design ideas, Feb. 19, 2004, 1 page.
Google Search Results for, "dali query group," retrieved from http://www.google.com/search?hl=en&client=firefox-a&rls=org.mozilla:en—on Apr. 8, 2010, 2 pages.
Hardwick, M., "DC power wire also carries clock or data," EDN Design Ideas, Mar. 13, 1998, 1 page.
Hexcel Composites, "Sandwich Panel Fabrication Technology," retrieved from http://www.hexcel.com/NR/rdonlyres/B4574C2C-0644-43AC-96E2-CC15967A4b)5/4547 Sandwich Fabrication.pdf, dated Jan. 1997, 16 pages.
Jackson, S., "Circuit protects bus from 5V swings," EDN Design Ideas, Nov. 14, 2002, p. 102.
Klepin, K., "Temperature Compensation for High Brightness LEDs using EZ-Color (TM) and PSoC Express," Cypress Perform, Aug. 10, 2007, 4 pages.
Kremin et al., "Multichannel LED Dimmer with CapSense Control—AN13943," Cypress Perform, Jul. 20, 2007, 5 pages.
Kropf, B., "Firmware—RGB Color Mixing Firmware for EZ-Color (TM)—AN16035," Cypress Perform, Jun. 13, 2007, 7 pages.
Lager, A., "Use a 555 timer as a switch-mode power supply," EDN Design Ideas, Nov. 14, 2002, 1 page.
Lee, M., "Shunt Battery Charger Provides 1A Continuous Current," EDN Design Ideas, Nov. 20, 1997, 2 pages.
Locher, R., "Introduction to Power MOSEFETs and their Applications," Fairchild Semiconductor (TM), Oct. 1998, 15 pages.
Miller, R., "Digital addressable lighting interface protocol fosters systems interoperability for lower costs and greater design flexibility," RNM Engineering, Inc., Apr. 1, 2003, 20 pages.
Mixed-Signal Design Guide, "1-Wire Products Deliver a Powerful Combination . . . ," Dallas Semiconductor Maxim, 2005, 7 pages.
Nell, S., "VCO uses programmable logic," EDN Design Ideas, Nov. 14, 2002, 1 page.
News & Events DALI Digital addressable lighting interface lamp luminaire control, accessed at http://www.dali-ag.org/ on Apr. 8, 2010, original publication date unknown, updated Apr. 8, 2010, 1 pg.
O'Loughlin, M., "350-W, Two-Phase Interleaved PFC Pre-regulator Design Review," Texas Instruments, Mar. 2007, 21 pages.
O'Loughlin, M., "PFC Pre-Regulator Frequency Dithering Circuit," Texas Instruments, May 2007, 8 pages.
Operating Manual, "DALI to DMX Dekoder 7064A-H Mk1," Soundlight, 2008, 8 pages.
OWL2c and conductivity, "Conductivity with the BS2/OWL2," EME Systems, Berkeley CA U.S.A., 2002, 3 pages.
Perrin, R., "Inexpensive Relays Form Digital Potentiometer," EDN Design Ideas, 1998, 2 pages.
Petersen, A., "Harness solar power with smart power-conversion techniques," EDN designfeature, Feb. 4, 1999, pp. 119-124.
Prendergast, P., "How to Design a Three-Channel LED Driver," Cypress Perform, Jan. 2008, 9 pages.
R8C/25, "Demonstration Example for DALI Lighting Protocol Stack," Renasas, Jul. 2008, 14 pages.
Richardson, C., "LM3404 Driving a Seoul Semi Zpower P4 1A LED—RD-I34," National Semiconductor, Apr. 2007, 6 pages.
Richardson, C., "Matching Driver to LED," National Semiconductor, Jan. 2008, 5 pages.
Rogers, E., "Understanding Boost Power Stages in Switchmode Power Supplies," Texas Instruments, Mar. 1999, 32 pages.
Rogers, E., "Understanding Buck Power Stages in Switchmode Power Supplies," Texas Instruments, Mar. 1999, 36 pages.
Seattle Robotics Society, "Implementing Infrared Object Detection," retrieved from http://web.archive.org/web/20080528042614rejwww.seattlerobotics.org/guide/infrared.html on Apr. 7, 2010, 4 pages.

(56) References Cited

OTHER PUBLICATIONS

Shanmugam, S., "Design of a linear Fresnel lens system for solar photovoltaic electrical power source," Center for Robotics Research, Oct. 5, 2001, 8 pages.
Shill, M., "Simple logic probe uses bicolor LED," EDN Design Ideas, Mar. 13, 1998, 2 pages.
Software Design Specification, "Z-Wave Protocol Overview," ZENSYS, May 9, 2007, 20 pages.
Takahashi A., "Methods and Features of LED Drivers," Electronic Products, Mar. 2008, 3 pages.
UPB Universal Powerline Bus, "Universal Powerline Bus Communication Technology Overview," PCS Powerline Control Systems, Jan. 8, 2002, 13 pages.
UPB Universal Powerline Bus, "UPB Technology Description," PCS Powerline Control Systems, Apr. 16, 2007, 68 pages.
US Final Office Action on U.S. Appl. No. 18/442,490 dated Oct. 31, 2024.
US Final Office Action on U.S. Appl. No. 18/676,438 dated Nov. 1, 2024.
US Non-Final Office Action on U.S. Appl. No. 18/442,490 dated Aug. 9, 2024 (14 pages).
US Non-Final Office Action on U.S. Appl. No. 18/676,438 dated Aug. 19, 2024 (13 pages).
US Notice of Allowance on U.S. Appl. No. 18/442,490 dated Apr. 7, 2025.
US Notice of Allowance on U.S. Appl. No. 18/676,438 dated Apr. 7, 2025.
Van Dorsten, A., "A Low Cost Step-up Converter by IC 555," Circuit Project Electronic, Jul. 21, 2007, 2 pages.
Walma, K., "DALI: Forerunner of Today's Breakthrough Lighting Technology," Consulting-Specifying Engineer, Feb. 20, 2007, 2 pages.
Wikipedia, "Digital Addressable Lighting Interface," retrieved from http://en.wikipedia.org/wikiJDigital_Addressable_Lighting_Interface accessed on Apr. 8, 2010, 3 pages.
Witt, J., "Switched-capacitor regulator provides gain," EDN Design Ideas, Mar. 13, 1998, 2 pages.
Wojslaw, C., "DPP adds versatility to VFC," EDN Design Ideas, Nov. 14, 2002, 1 page.
Young, R., "Power circuit terminates DDR DRAMs," EDN Design Ideas, Nov. 14, 2002, 1 page.
Z-Wave Vizia Etc thread, "Aspire Control System Wins Major Design Awards," retrieved from http://groups.google.com/group/comp.home.automation/browse_thread/thread/449c2c66934dfSfb/fSI12116a8231aa1?Ink=st&q=z-wave&rnum=98#fSI12116a8231aa1, www.ztech.com, dated Sep. 10, 2007, 18 pages.
Zarr, R., "Driving High-Power LEDs," Machine Design, Oct. 2007, 3 pages.
Zensys, "ASCII Interface," VIZIA RF, 2007, 12 pages.
ZXCT 1009, "High-Side Current Monitor," ZETEX, Apr. 2001, 8 pages.
https://www.youtube.com/watch?v=WypiaOl6Gt8.

* cited by examiner

200

COVE LIGHT FIXTURE WITH HIDDEN INTEGRATED AIR RETURN

CROSS-REFERENCE TO RELATED APPLICATION

This application claims the benefit of and priority under 35 U.S.C. § 120 as a continuation of U.S. patent application Ser. No. 18/442,490, filed Feb. 15, 2024, which claims the benefit of and priority under 35 U.S.C. § 119 to U.S. Provisional Application No. 63/446,205, filed Feb. 16, 2023, titled "COVE LIGHT FIXTURE WITH HIDDEN INTEGRATED AIR RETURN." Each of the foregoing applications is incorporated herein by reference in its entirety.

FIELD OF THE DISCLOSURE

This disclosure relates generally to a cove light fixture with hidden integrated air return. In particular, the systems and methods of this disclosure can provide a cove lighting structure including a return air structure.

BACKGROUND

Light fixtures can be installed in various entities (e.g., interior of a building). The light fixtures can be coupled to a power source. The power source can store and supply power for the light fixtures. The light fixtures can receive power from the power source for illumination.

BRIEF SUMMARY OF THE DISCLOSURE

Systems and methods of this disclosure are directed to cove lighting with return air. The return air can be hidden such that it is not viewable from a floor or ground when installed. In various structural architectures, entities may desire to include mechanical systems, components, technologies, or other structures in the interior of their building. However, blending or including some of these structures as part of the interior may interfere with the interior design of the building. It may be difficult to maintain a minimalistic design when certain structures occupy the interior space. Instead, it may be desired for the structures (e.g., lighting, smoke detector, fire suppression system, ventilation system, sensors, or wireless networking components, among other architectural interior components) to operate or function in the background without being in the view of the entities. Further, in certain architectural spaces, flangeless trim return air systems may be installed, which involves tape and spackled into the wall system or ceiling of the building. In such cases, it may be desired to minimize the complexity or resources involved in the installation of certain interior structures or components (e.g., return air system).

The systems and methods discussed herein can provide a cove lighting structure implemented with a return air structure (e.g., return air system). The cove lighting structure can contribute to or enhance the interior design of a building by combining or blending the return air structure, a cove structure, and at least one light fixture as part of the cove lighting structure. By integrating the air return with the cove light fixture, the air return can be hidden or not viewable from certain angles, thereby providing a more seamless design while reducing components or structures and reducing complexity of installation. For example, the cove lighting structure can include a cove structure (e.g., extruded aluminum cove or extrusion) composed of at least one type of suitable material, such as metal (e.g., aluminum, steel, copper, etc.), wood, or plastic, among others. The cove lighting structure can include the return air structure configured to receive return air for a heating, ventilation, and air conditioning (HVAC) system, or other types of ventilation systems. The return air structure may be embedded with the cove structure. The cove lighting structure can include at least one light fixture configured to provide cove lighting for the interior of a building.

The cove structure, the return air structure, and the lighting structure can be a part of a single structure or component for installation in the interior of the building. In some cases, at least one of the cove structure, the return air structure, or the lighting structure may be an independent component/structure coupled to or installed on one or more other structures. The cove structure can be configured to reduce, minimize, or block the visibility of the lighting structure and the return air structure, e.g., from certain viewing angles. Hence, by combining the features of the cove structure, the return air structure, and the lighting structure as part of the cove lighting structure, the systems and methods of the technical solution discussed herein can improve the interior design of the building by hiding the return air structure and the lighting structure from view, and minimize the complexity and resources for installation of the return air structure.

In one aspect, this disclosure is directed to a system for cove lighting. The system can include a cove lighting structure. The cove lighting structure can include a return air structure comprising a vent configured to receive return air. The cove lighting structure can include a cove structure connected with a platform extended laterally from the return air structure. The cove lighting structure can include a light fixture comprising a light source configured to provide cove lighting. The light fixture can be positioned above the platform and between the cove structure and the return air structure.

The vent of the return air structure can detect the return air towards a heating, ventilation, or air condition system. The return air structure can be positioned to dissipate heat from the light source. The return air structure can comprise a plurality of slots to form a plurality of vents. The return air structure can comprise a height that is less than a height of the light fixture.

The cove lighting structure can include a second return air structure separated from the return air structure by a predetermined distance. The cove structure can be mechanically connected to a ceiling. The cove structure can be formed from an extrusion of one or more metals.

The light source can be positioned to direct light towards a surface of at least one of a ceiling or a wall. The light fixture can comprise an optical window that directs light at least 180 degrees. The light source can be electrically connected to a backup battery system. The light source can be closer to a wall of the cove structure relative to the return air structure. The light source can be separated from the return air structure by a predetermined distance.

In an aspect, this technical solution can be directed to an apparatus. The apparatus can include a return air structure comprising a vent configured to receive return air. The apparatus can include a cove structure connected with a platform extended laterally from the return air structure. The apparatus can include a light fixture comprising a light source configured to provide cove lighting. The light fixture can be positioned above the platform and between the cove structure and the return air structure.

The return air structure can comprise a plurality of slots to form a plurality of vents. The apparatus can include a second return air structure separated from the return air structure by a predetermined distance. The cove structure can be formed from an extrusion of one or more metals. The light fixture can comprise an optical window that directs light at least 180 degrees.

In an aspect, this technical solution can be directed to a method. The method can include providing a cove lighting structure. The cove lighting structure can include a return air structure comprising a vent configured to receive return air. The cove lighting structure can include a cove structure connected with a platform extended laterally from the return air structure. The cove lighting structure can include a light fixture comprising a light source configured to provide cove lighting. The light fixture can be positioned above the platform and between the cove structure and the return air structure.

The method can include mechanically connecting the return air structure to direct the return air towards a heating, ventilation, or air condition system. The method can include coupling the cove lighting structure to a ceiling or a wall.

These and other aspects and implementations are discussed in detail below. The foregoing information and the following detailed description include illustrative examples of various aspects and implementations, and provide an overview or framework for understanding the nature and character of the claimed aspects and implementations. The drawings provide illustration and a further understanding of the various aspects and implementations, and are incorporated in and constitute a part of this specification.

BRIEF DESCRIPTION OF THE FIGURES

The accompanying drawings are not intended to be drawn to scale. Like reference numbers and designations in the various drawings indicate like elements having similar structure or functionality. For purposes of clarity, not every component may be labeled in every drawing. In the drawings.

Figure 1:
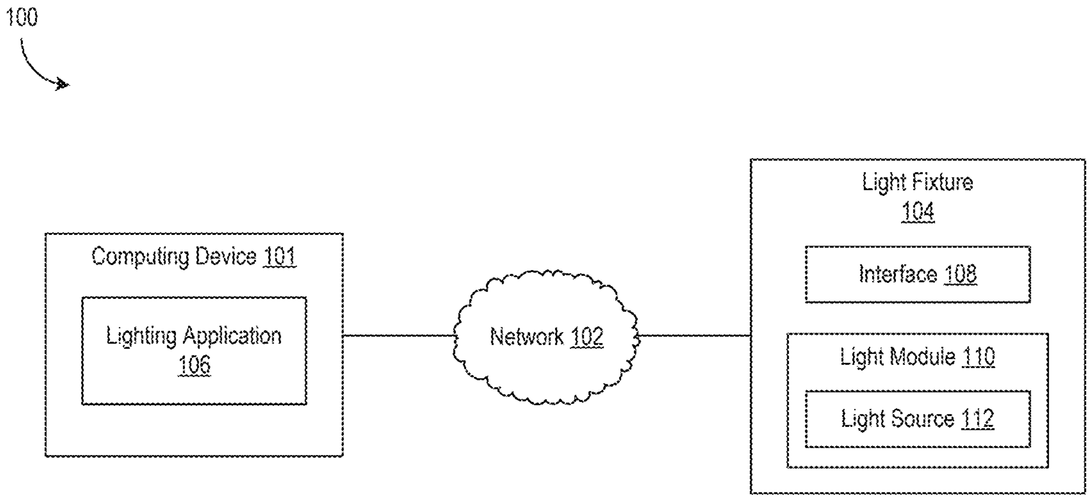
FIG. 1 is a block diagram of an example system for lighting control, in accordance with an implementation.

The features and advantages of the present solution will become more apparent from the detailed description set forth below when taken in conjunction with the drawings, in which like reference characters identify corresponding elements throughout. Other features, aspects, and advantages of the subject matter will become apparent from the description, the drawings, and the claims.

DETAILED DESCRIPTION

Following below are more detailed descriptions of various concepts related to, and implementations of, methods, apparatuses, and systems of cove light fixture with hidden integrated air return. The various concepts introduced above and discussed in greater detail below may be implemented in any of numerous ways.

In various structural architectures, it may be desired for an interior of a building to include mechanical systems, components, technologies, or other structures while maintaining a minimalistic design. However, it may be challenging for certain structures, such as a return air system, to operate or function in the background without being in the view of the entities or individuals present in the interior space of the building. In certain architectural spaces, flangeless trim return air systems may be installed, which involves tape and spackled into the wall system or ceiling of the building. In such cases, it may also be desired to minimize the complexity or resources involved in the installation of certain interior structures or components (e.g., return air system).

The systems and methods discussed herein can provide a cove lighting structure implemented with a return air structure (e.g., return air system). The cove lighting structure can contribute to or enhance the interior design of a building by combining or blending the return air structure, a cove structure, and at least one light fixture as part of the cove lighting structure. For example, the cove lighting structure can include a cove structure (e.g., extruded aluminum cove or extrusion) composed of at least one type of suitable material, such as metal (e.g., aluminum, steel, copper, etc.), wood, or plastic, among others. The cove lighting structure can include the return air structure configured to receive return air for a heating, ventilation, and air conditioning (HVAC) system, or other types of ventilation systems. The return air structure may be embedded with the cove structure. The cove lighting structure can include at least one light fixture configured to provide cove lighting for the interior of a building.

The cove structure, the return air structure, and the lighting structure can be a part of a single structure or component for installation in the interior of the building. In some cases, at least one of the cove structure, the return air structure, or the lighting structure may be an independent component/structure coupled to or installed on one or more other structures. The cove structure can be configured to reduce, minimize, or block the visibility of the lighting structure and the return air structure, e.g., from certain viewing angles. Hence, by combining the features of the cove structure, the return air structure, and the lighting structure as part of the cove lighting structure, the systems and methods of the technical solution discussed herein can improve the interior design of the building by hiding the return air structure and the lighting structure from view, and minimize the complexity and resources for installation of the return air structure.

Referring now to FIG. 1, a block diagram of an example system 100 (e.g., lighting system) for lighting control is shown. The system 100 can include at least one computing device 101, at least one network 102, and at least one light fixture 104. The components (e.g., computing device 101, network 102, or light fixture 104) of the system 100 can include or be composed of hardware, software, or a combination of hardware and software components. Certain components (e.g., computing device 101, network 102, or light fixture 104) of the system 100 can be (e.g., electrically) coupled with each other either via wired interface to distribute electrical energy or power.

The one or more components of the system 100 (e.g., computing device 101 or light fixture 104) can communicate with each other by establishing a communication channel via the network 102. For example, the computing device 101 can communicate with the light fixture 104 via the network 102. The various different network devices (e.g., computing device 101, light fixture 104, etc.) can establish at least one communication channel between each other via the network 102 or different networks 102, such as for transmission or reception of information. In some cases, one or more of the devices (e.g., computing device 101 or light fixture 104) may be located in a physical location or space (e.g., a building or a structural architecture), such that communication can be performed via wired connection(s).

The network 102 can include computer networks such as the Internet, local, wide, metro or other area networks, intranets, satellite networks, other computer networks such as voice or data mobile phone communication networks, and combinations thereof. The network 102 may be any form of computer network that can relay information between the one or more components of the system 100. The network 102 can relay information between the computing device 101 and light fixtures 104, amongst others. In some implementations, the network 102 may include the Internet and/or other types of data networks, such as a local area network (LAN), a wide area network (WAN), a cellular network, a satellite network, or other types of data networks. The network 102 may also include any number of computing devices (e.g., computers, servers, routers, network switches, etc.) that are configured to receive and/or transmit data within the network 102. The network 102 may further include any number of hardwired and/or wireless connections. Any or all of the devices or components with communication interfaces described herein (e.g., computing device 101 or light fixture 104) may communicate wirelessly (e.g., via Wi-Fi, cellular, radio, etc.) with a transceiver that is hardwired (e.g., via a fiber optic cable, a CAT5 cable, etc.) to other devices or components in the network 102. Any or all of the devices or components described herein (e.g., computing device 101 or light fixture 104) may also communicate wirelessly with other devices or components of the network 102 via a proxy device (e.g., a router, network switch, or gateway).

The computing device 101 (e.g., client device or operator device) can include at least one interface for establishing a connection to the network 102. The computing device 101 can include a lighting application 106. The lighting application 106 can be a hardware, software, or a combination of hardware and software components configured or programmed to interface with the light fixture 104. The computing device 101 can communicate with other components of the system 100 via the network 102, such as the light fixture(s) 104. For example, computing device 101, using the lighting application 106, can communicate with the light fixture 104 by forwarding data packets to the network 102 for forwarding to the light fixture 104. The computing device 101 can send commands or instructions to the light fixture 104 to adjust their setting, such as brightness, color, "on" duration, "off" duration, etc. In some cases, the computing device 101 can communicate directly to the one or more light fixture 104 via wired or wireless connection, such as without communicating with an intermediary device (e.g., the network 102). The computing device 101 may be local to or remote from the physical location of the light fixture 104.

The computing device 101 can include, store, execute, or maintain various application programming interfaces ("APIs") in the memory (e.g., local to the computing device 101). The APIs can include or be any types of API, such as Web APIs (e.g., open APIs, Partner APIs, Internal APIs, or composite APIs), web server APIs (e.g., Simple Object Access Protocol ("SOAP"), XML-RPC ("Remote Procedure Call"), JSON-RPC, Representational State Transfer ("REST")), among other types of APIs or protocol. The computing device 101 can use at least one of various protocols for communication other devices. The protocol can include at least a transmission control protocol ("TCP"), a user datagram protocol ("UDP"), or an internet control message protocol ("ICMP"). The communicated data can include a message, a content, a request, or otherwise information to be transmitted from the computing device 101 to other devices in the network 102.

The computing device 101 can be operated by the operator, user, or entity. The computing device 101 can receive the status information from individual light fixtures 104. The computing device 101 can receive a command or instructions input by the operator, such as configuring the setting for the light fixture 104. The computing device 101 can send updated configurations to one or more light fixtures 104. The computing device 101 may update the configurations of the light fixture 104 responsive to receiving inputs from the operator or after a predetermined time interval.

The computing device 101 may include a user interface, such as a graphical user interface (GUI) or one or more input/output (I/O) devices. The GUI can include or correspond to a touchscreen, a display (e.g., including features or functionalities of the display 535), etc. The I/O device can include at least one of a mouse, a keyboard, a microphone, one or more speakers, one or more cameras, one or more biometric scanners, one or more environmental sensors, one or more accelerometers, etc. The GUI may present or enable/activate a display of information related to the lighting application 106, e.g., including information or data associated with the light fixture 104.

For example, the computing device 101 can provide a display of the lighting application 106 via the GUI. The GUI can include any non-limiting GUI elements for presenting the lighting application 106, such as but not limited to icons, interactive elements (e.g., buttons, sliders, or dropdown menus), images, settings, notifications, texts, etc. In some cases, the lighting application 106 can include one or more settings or configurations of the light fixture 104 (or the light module 110). The computing device 101 can provide the one or more settings or configurations of the light fixture 104 for display via the GUI. The computing device 101 may receive instructions or an indication of interaction from the operator via the GUI, e.g., interaction with the lighting application 106. The computing device 101 may receive changes to the settings of the light fixture 104 via the GUI. The computing device 101 may transmit data packets including updated configuration to the light fixture 104 using the lighting application 106.

The light fixture 104 can correspond to an electrical device configured with at least one interface 108, and at least one light module 110, among other hardware or software components, such as sensors, indicators, battery, memory, etc. The light module 110 can include at least one light source 112. The light fixture 104 can be positioned or configured for uplighting. Uplighting can refer to a lighting effect provided by positioning one or more light fixtures 104 vertically, including relatively near the floor and facing the light fixtures 104 relatively upward (e.g., towards the ceiling). The specific configuration, positioning, or lighting direction may be adjustable, and not limited to a specific angle or height, for example. In some cases, the light fixture 104 can be positioned relatively near a cove portion of the wall or ceiling, among other locations. The uplighting can provide a level of lighting to the ceiling, thereby ensuring the ceiling, and the interior space, are lit. In some configurations, the light fixture 104 can be positioned to face other directions, such as the wall, a cove structure, etc. To achieve uplighting, the light fixture 104 can include a wide optical window, thereby ensuring that any opaque part of the light fixture 104 may not create a lighting cutoff, e.g., of less than 180 degrees. For example, the optical window of the light fixture 104 can allow the light source 112 to direct light at least 180 degrees. Ensuring that no cutoff is presented can mitigate scalloping effects or cutoff lines in the illumination generated by the light fixtures 104. For example, the light fixtures 104 can include an optical system (e.g., corresponding to or as a part of the light module 110). The optical system can include a side component at a predefined angle to the optic (e.g., light sources 112) configured to allow the light to reflect and transmit upward, such as towards the ceiling into the space. According to the configuration of the light fixture 104, the light beam can be widened beyond at least 180 degrees to create uplighting.

In some configurations, the light fixture 104 may be positioned relative to a cove portion of other structures, not limited to the wall or ceiling, such as other objects or architectures. For example, in some aspects, the light fixture 104 may be positioned relatively near a cove portion between the floor and the wall, e.g., the light fixture 104 positioned proximate to the floor directing the lighting effect horizontally to the cove portion formed between the floor and the wall. In another example, the light fixture 104 may be positioned relatively near a cove portion of an object or structure, not limited to the wall or the ceiling. In some other aspects, the light fixture 104 may be positioned according to or relative to the location of the vents (e.g., return air vent 204, such as described in conjunction with at least one of FIGS. 2-4).

The interface 108 can interface with the network 102, devices, or components within the system 100 (e.g., the computing device 101), or components of the light fixture 104 (e.g., light module 110). The interface 108 can include features and functionalities to interface with the aforementioned components. For example, the interface 108 can include power transmission lines (e.g., cables or conductive structures), standard telephone lines LAN or WAN links (e.g., 802.11, T1, T3, Gigabit Ethernet, Infiniband), broadband connections (e.g., ISDN, Frame Relay, ATM, Gigabit Ethernet, Ethernet-over-SONET, ADSL, VDSL, BPON, GPON, fiber optical including FiOS), wireless connections, or some combination of any or all of the above. Communication connections can be established using a variety of communication protocols (e.g., TCP/IP, Ethernet, ARCNET, SONET, SDH, Fiber Distributed Data Interface (FDDI), IEEE 802.11a/b/g/n/ac CDMA, GSM, WiMax and direct asynchronous connections). Electric power connections can be established via overhead transmission lines, underground transmission lines, or subtransmission lines, among other types of transmission lines. The interface 108 can include at least a built-in network adapter, network interface card, PCMCIA network card, EXPRESSCARD network card, card bus network adapter, wireless network adapter, USB network adapter, modem, or any other device suitable for interfacing one or more devices within the system 100 to any type of network capable of communication. The interface 108 can establish a connection with one or more aforementioned components to receive or transmit information, such as with other light fixtures 104 or devices (e.g., computing device 101) within the network 102. The interface 108 can establish a connection with the computing device 101 directly or communicate with the computing device 101 indirectly via an intermediary device (e.g., gateway device).

In some configurations, the interface 108 can transmit data to the lighting application 106 of the computing device 101 via the network 102. For example, the interface 108 can send information related to the lighting fixture 104 (e.g., the light module 110 or the light source 112), such as settings or configurations of the light fixture 104 for presentation via the GUI of the computing device 101. The setting or configuration may include configurable brightness, color, or effects, among others. In some cases, the light fixture 104 may include one or more sensors, such as at least one positioning sensor (e.g., global positioning sensor (GPS)), temperature sensor, angular position sensor, or electricity meter (or sensor). In this case, the interface 108 may send sensor data to the lighting application 106 for presentation via the GUI of the computing device 101.

The light module 110 can be a housing or a component to contain the light source 112. The light module 110 can be composed of any suitable material, not limited to plastic, wood, acrylic, metal, or glass. The light module 110 can be structured or formed into any non-limiting shape or form. The light source 112 can include or correspond to a device configured to generate illumination when supplied with sufficient electrical power (e.g., 2 watts (W), 5 W, 50 W, 100 W, and so on). The light module 110 can be positioned throughout the light fixture 104.

The light module 110 can be a part or an extension of the light fixture 104. The light module 110 may be fixed to the light fixture 104. In some cases, the light module 110 can be an independent component, capable of coupling to the light fixture 104. For example, the light module 110 can be coupled to or decoupled from the light fixture 104 using at least one suitable coupling mechanism, such as a snap connector, latch coupling, clamp, friction fitting, magnetic coupling, etc.

The light source 112 may be a part of the light module 110, e.g., fixed to the light module 110. In some cases, the light source 112 may be an independent component, capable of coupling to the light module 110. For instance, the light source 112 may be coupled to or decoupled from the light module 110 using at least one suitable coupling mechanism. The light source 112 (or the light fixture 104) can be positioned or angled to direct light toward the surface of at least one of the wall or the ceiling.

In some cases, the light fixture 104 can include at least one memory (e.g., memory device) configured to store data, information, or configurations local to the light fixture 104. The memory can be, for instance, a random access memory (RAM) or other dynamic storage device. For example, the memory can include, store, or maintain the embedded code of the light fixture 104. The memory can store the settings of the light fixture 104, such as on/off state, capabilities (e.g., configurable color or brightness), on or off timer, lighting effects, protocol used for communication, driver information, or other related operating information.

In some cases, the light fixture 104 can include or be coupled to a backup battery (or a backup battery system) internal or external from the light fixture 104. In certain scenarios, the light fixture 104 can switch to the backup battery to enable electric power to be supplied from the backup battery to the light source 112 responsive to detecting, via a sensor, an insufficient amount of power received from a power source (e.g., from an external power source). The backup battery can be coupled to or decoupled from the light fixture 104 via any suitable coupling mechanism. In various configurations, the light fixture 104 can be interconnected with at least one other light fixture. In this case, the light fixtures 104 can communicate with each other via the network 102.

Figure 2:
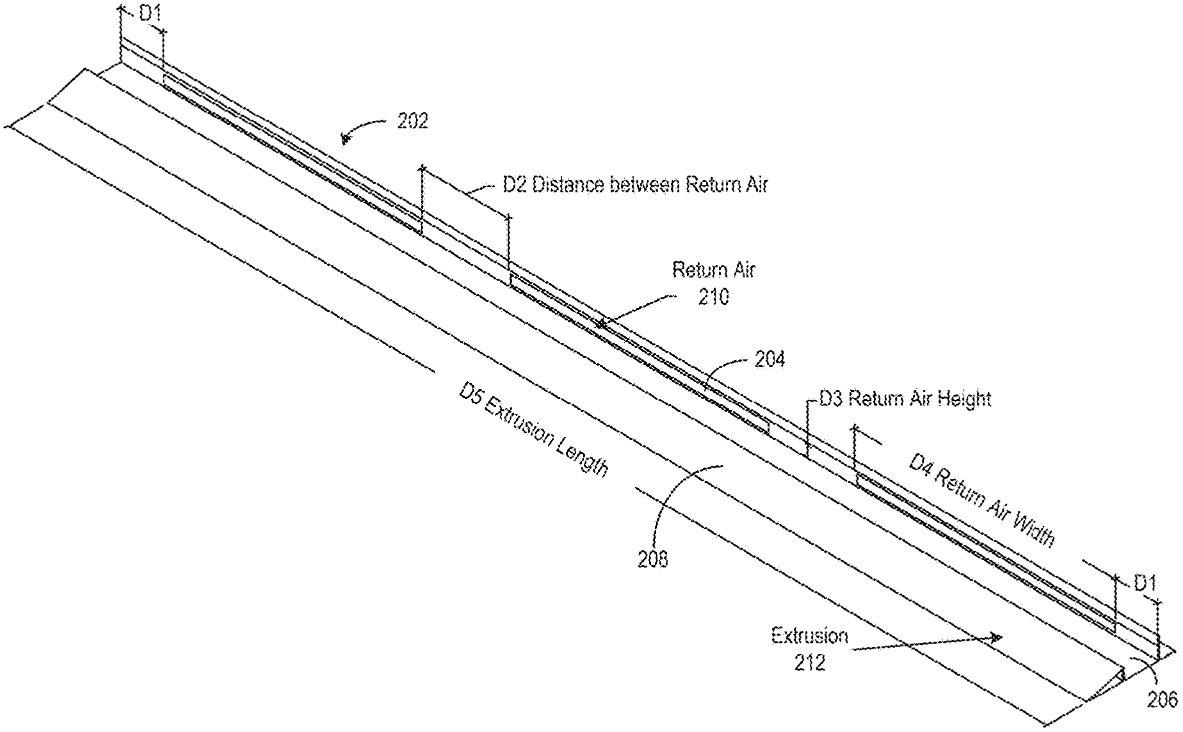
FIG. 2 is a perspective view of an example cove lighting structure, in accordance with an implementation.
Figure 3:
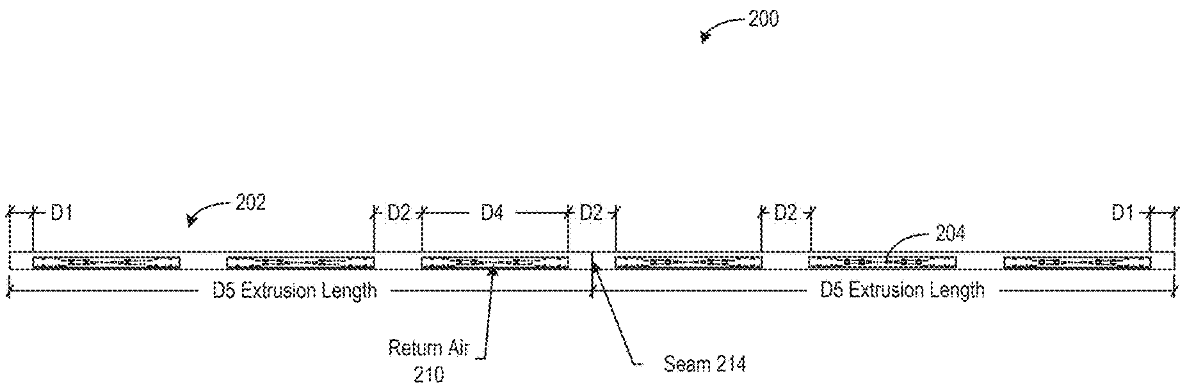
FIG. 3 is a front view of the example cove lighting structure of FIG. 2, in accordance with an implementation.
Figure 4:
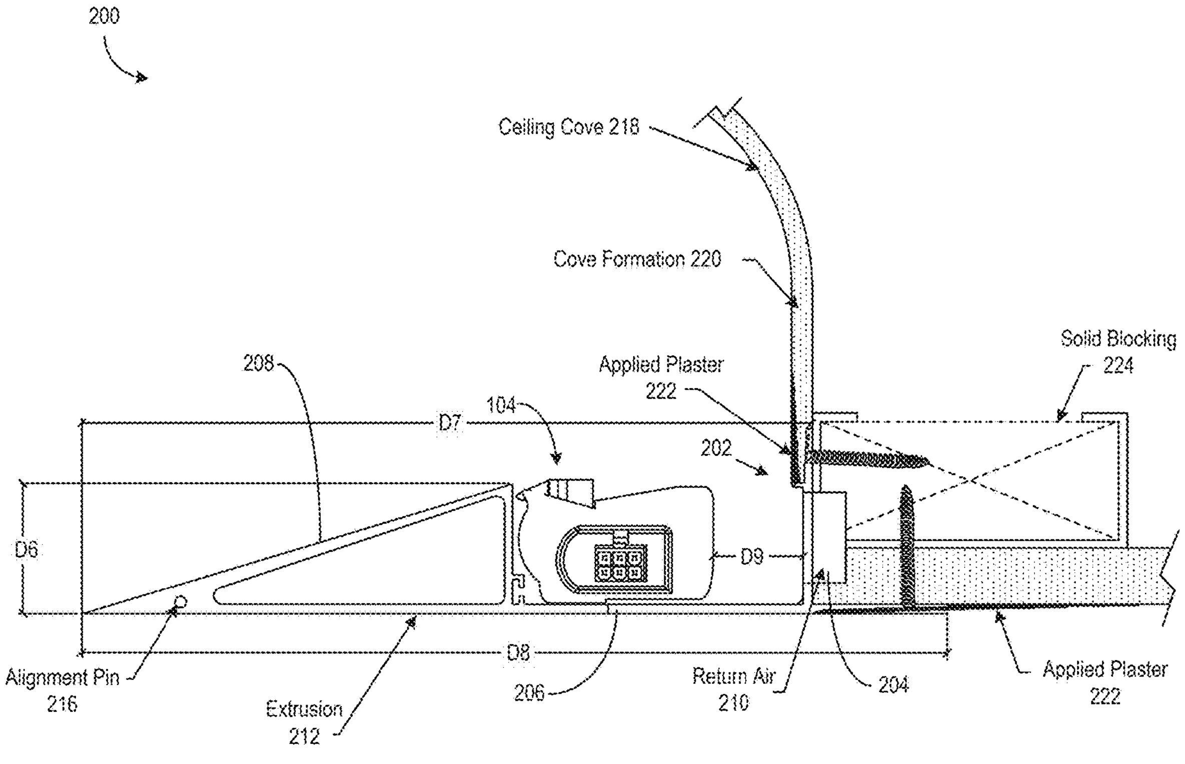
FIG. 4 is a side view of the example cove lighting structure of FIG. 2, in accordance with an implementation.

Referring to FIG. 2, depicted is a perspective view of an example cove lighting structure 200. FIG. 3 is a front view of the example cove lighting structure 200 of FIG. 2. FIG. 4 is a side view of the example cove lighting structure 200 of FIG. 2. The cove lighting structure 200 can include at least one return air structure 202, at least one platform 206, and at least one cove structure 208. The cove lighting structure 200 can correspond to a single structure or component. In some cases, the cove lighting structure 200 can include a combination of individual components. For example, the return air structure 202 and the cove structure 208 may be a single component or separate components for coupling. In another example, at least a portion of the platform 206 can be a part of the cove structure 208 or at least a portion of the platform can be a part of the return air structure 202, such as an extension of the cove structure 208 or the return air structure 202. In some cases, the platform 206 can correspond to portions of the return air structure 202 and the cove structure 208 that interconnects these two components or structures to form the cove lighting structure 200. In some aspects, the platform 206 can refer to or include one or more components or functionalities of the light fixture 104. In some other aspects, the platform 206 can refer to or include one or more components or functionalities of the light module 110. In some cases, the platform 206 may be configured to position, elevate, or hold the light fixture 104, for instance, via at least one suitable coupling mechanism, such as adhesive, magnetic, friction fit, bolt, etc.

The cove structure 208 may be referred to as a cove construction or a cove component of the cove lighting structure 200. The cove structure 208 can be composed of at least one type of suitable material, such as metal, wood, plastic, etc. The cove structure 208 may be fabricated into a relatively small form factor for manufacturing purposes, for example. The cove structure 208 can be a foundation for the installation of the light fixture 104 (e.g., including light module 110). For instance, the cove structure 208 can include or be coupled to the platform 206 for coupling, placing, or positioning the light fixture 104.

The return air structure 202 can include one or more return air vents 204 (e.g., sometimes referred to as return air openings, slots, or entries). For instance, the return air structure 202 can include one or more slots corresponding to or forming the one or more return air vents 204. The return air vents 204 can be configured to receive air (e.g., return air 210) for supplying or directing to an air condition system, heating system, or other ventilation systems (e.g., heating, ventilation, and air conditioning (HVAC) system). The return air 210 can include or correspond to air that returns to the HVAC system, for instance, from the area being cooled or heated. One or more of the return air vents 204 can include similar or different dimensions compared to one or more other return air vents 204, such as similar or different width (e.g., D4), height (e.g., D3), or depth. The return air vents 204 may be separated from each other by a predefined width (e.g., D2). The return air vents 204 proximate to the edge of the return air structure 202 can be separated or distal from the edge by a predefined distance (e.g., D1).

In some cases, the return air structure 202 (or the return air vents 204) can be a part of the cove structure 208. For example, slotted provisions (e.g., vents) for handling the return air can be formed or structured into the cove structure 208. The return air 210 can serve or provide an essential function to any (interior) space of a build. It may be desirable to hide the return air structure 202 (e.g., sometimes referred to as a return air system) from visibility, such as to maintain or provide a particular type of interior design for the building. The return air vents 204 can be positioned below the sight line (e.g., thereby not being visible to an occupant of the space). As shown in FIG. 4, the return air vents 204 can be located out of sight (e.g., hidden) from the occupant without impacting the form factor (e.g., small) of the cove, thereby improving the interior design for the space with the return air system. With the return air structure 202 built into the cove structure 208, the material used to form other types of return air systems (e.g., a flangeless trim return air system) can be avoided, and the installation complexity can be minimized.

In some configurations, the cove lighting structure 200 can include multiple return air structures 202, such as shown in conjunction with at least FIG. 3. The return air structures 202 may be positioned horizontally (or in some cases, vertically) to each other. For example, the cove lighting structure 200 can include a first return air structure and a second return air structure. The first and second return air structures can be (e.g., horizontally) separated from each other by a predetermined distance. In some cases, the first and second return air structures can be in contact with or coupled to each other, which may form a seam 214 or may be seamless in appearance or construction, for example. The seam 214 (e.g., sometimes referred to as a butted seam) can include or refer to a joint (or a seam) where the edges of, in this case, the first and second return air structures meet relatively squarely (e.g., forming a right angle), thereby providing a flush or seamless junction, e.g., without overlap or extension of the two return air structures.

The cove structure 208 can include or be formed from an extrusion 212. The extrusion 212 (e.g., sometimes referred to as an extension) can be composed of at least one suitable material, such as metal, plastic, wood, etc. For example, the cove structure 208 can be extended laterally from the return air structure 202, thereby creating a distance from the edge of the cove structure 208 to the return air structure 202. The distance of the extrusion 212 (or extension) for the cove structure 208 may be configurable. In some cases, the length (e.g., D5) of the extrusion 212 can be predefined according to manufacturing specifications. In some cases, the cove structure 208 can provide a vertical extension (e.g., as part of the extrusion 212) to block or hide the return air vents 204 from visibility by the occupant of the space.

For example, the extrusion 212 of the cove structure 208 can include a predefined vertical height (e.g., D6) suitable to prevent visibility of the return air vents 204 at various viewing angles. In some cases, the extrusion 212 may include a predefined vertical height suitable to hide the visibility of the light fixture 104. In another example, the extrusion 212 may be structured with one or more dimensions suitable to hide the visibility of at least a portion of the return air vent(s) 204 or the light fixture(s) 104.

In some configurations, the cove structure 208 may include at least one alignment pin 216 as part of the extrusion 212, among other parts of the cove structure 208. The alignment pin 216 can be positioned on or at the sides of the cove structure 208, as shown in conjunction with FIG. 4. The alignment pin 216 can be fitted to or secured on, for instance, at least one corresponding receptacle or supporting structure, such as a mount on other sides of the wall. The alignment pin 216 can assist with the alignment (e.g., positioning) of the cove lighting structure 200, e.g., to be at a predetermined or configured height, angle, orientation, or other alignments proximate to the wall or ceiling. In some cases, the alignment pin 216 can increase or improve the structural integrity of the cove lighting structure 200 (or the cove structure 208), including but not limited to increasing structural stability or durability, for example, by increasing structural resistance to lateral force, axial force, tangential force, etc.

The cove lighting structure 200 can include or be installed with the light fixture 104. In some cases, the light fixture 104 can be a separate component for installation to the cove lighting structure 200. In some other cases, the light fixture 104 can be embedded as part of the cove lighting structure 200. Using the technology in optical systems or solid state lighting, among other types of lighting technologies, for example, the light fixture 104 can be install relatively close to the ceiling of the interior space (e.g., relatively near the ceiling cove 218, such as shown in conjunction with FIG. 4). Hence, the cove lighting structure 200 can include the various features, such as the light fixture 104, the return air structure 202, and the cove structure 208, to contribute to the interior design of a building.

The light fixture 104 can be positioned on, above, or at the platform 206 of the cove lighting structure 200. The light fixture 104 can be positioned between the cove structure 208 and the return air structure 202 (or the return air vents 204). In some cases, the light fixture 104 (or the light source 112) can be separated from the return air vent(s) 204 or the return air structure 202 by a predetermined/predefined distance (e.g., D9), for instance, to allow for a desired gap or path to the return air vent(s) 204. The positioning of the light fixture 104 proximate to the return air vent(s) 204 of the return air structure 202 can allow for the dissipation of heat from the light source 112 via the return air vent(s) 204, for example. The light fixture 104 may be positioned at a predefined distance from the cove structure 208 or positioned next to the cove structure 208. As shown in conjunction with at least FIG. 4, the position of the light fixture 104 can be closer to the wall of the cove structure 208 relative to the return air structure 202. In this case, the wall of the cove structure 208 can refer to the portion or surface of the cove structure 208 facing the light fixture 104 and the return air structure 202.

In some cases, the return air structure 202 can include a height that is less than the height of the light fixture 104. In some other configurations, the return air structure 202 can include a height that is similar to or greater than the height of the light fixture 104, not limited to a height that is less than the height of the light fixture 104, for example.

The cove lighting structure 200 can be positioned relative to, near, or at a cove structure (e.g., cove portion). For example, the cove lighting structure 200 can be positioned proximate to a ceiling cove 218. The ceiling cove 218 may be formed at a ceiling formation 220. For instance, the ceiling formation 220 may refer to a portion of the wall or the ceiling where the ceiling cove 218, in this case, is formed with a tapered edge, such as shown in conjunction with FIG. 4. It should be noted that the ceiling cove 218 may be formed with other types of edges, such as rounded edge, flat edge, or beveled edge. The cove lighting structure 200 can be installed or coupled to a portion of the wall or the ceiling. The cove lighting structure 200 can be installed on or attached to the wall or the ceiling using at least one suitable installation mechanism, such as by applying plaster 222, nailing, gluing, or otherwise fixing at least a portion of the cove lighting structure 200 to at least one of the wall, the ceiling, etc. For instance, a portion of the cove lighting structure 200 may be fixed to a solid blocking 224 (e.g., wood, metal, or concrete) inside the wall or the ceiling, such as shown in conjunction with FIG. 4. It should be noted that the cove lighting structure 200 can be fixed or installed to structure, not limited to the solid blocking 224. In some cases, the portion(s) of the cove lighting structure 200 can be patched or applied with plaster 222 to provide a seamless appearance (or hide certain edges of the cove lighting structure 200. The cove lighting structure 200 may extend or protrude from the wall by a predefined distance (e.g., D7).

In some cases, a portion of the cove lighting structure 200 (e.g., the platform 206) may be extended (or can include an extension extending) under the return air vent 204, such as shown in conjunction with FIG. 4. For example, the cove lighting structure 200 with the extended portion can include or have a predefined horizontal width (e.g., D8). In some cases, the extension of the cove lighting structure 200 (that extends under the return air vent 204) can be installed or fixed to a portion of the ceiling or the wall, e.g., to be secured with a block, such as shown in conjunction with FIG. 4. In such cases, the cove structure 208 can be mechanically connected to at least a portion of the ceiling. Although the cove lighting structure 200 is shown to be positioned relative to the ceiling cove 218 (e.g., a cove portion at or near the ceiling), it should be noted that the cove lighting structure 200 can be structured for positioning at or relative to a cove portion of other structures or objects, not limited to the ceiling or wall, for example.

In various configurations, the cove lighting structure 200 (or one or more components of the cove lighting structure 200) can be aligned with the surface or the curvature of the wall or the ceiling. For example, the cove lighting structure 200 (e.g., the cove structure 208, extrusion 212, light fixture 104, or platform 206) can be linear or straight, e.g., to align with a flat wall or a flat ceiling. In another example, the cove lighting structure 200 (e.g., the cove structure 208, extrusion 212, light fixture 104, or platform 206) can include curvature, be curved, or in some cases, be circular or at least partially have a circular shape, such as an oval or ellipse. For instance, the curvature of the cove lighting structure 200 may align with a curved wall or a curved ceiling. In such cases, the return air structure 202 or the return air vent 204 may be located or configured at the posterior, rear, or back position of the curvature of the cove lighting structure 200, for example. The cove lighting structure 200 may include other alignment features, for example, in addition, or alternative to those discussed herein.

Figure 5:
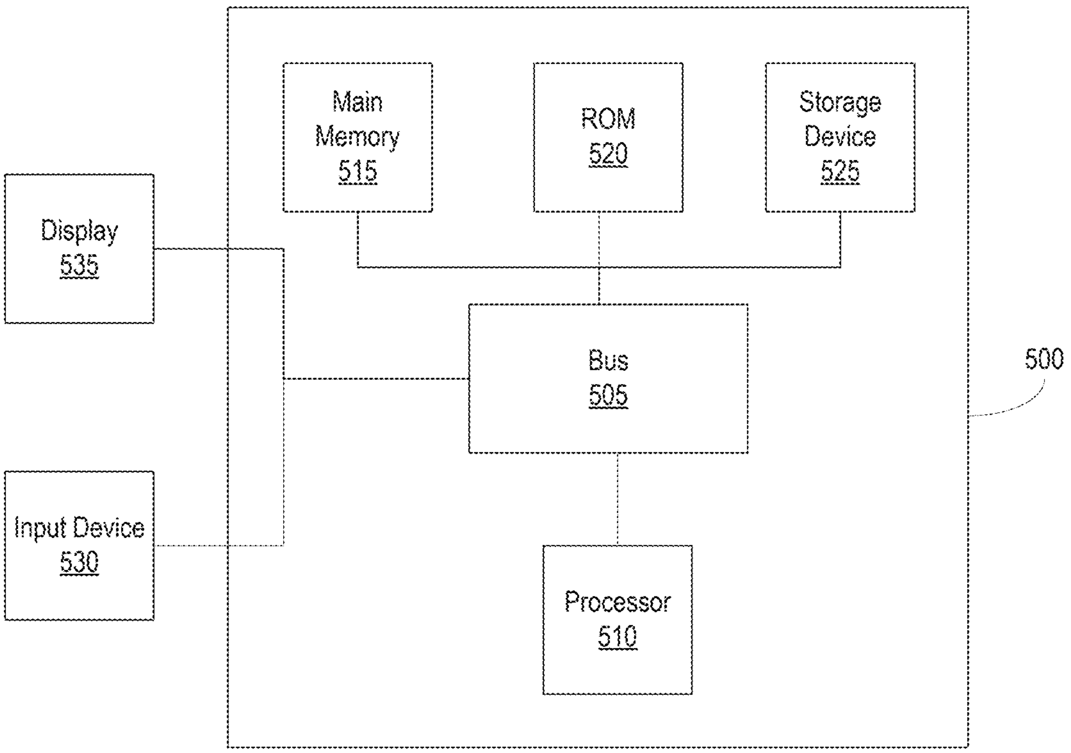
FIG. 5 is a block diagram illustrating an architecture for a computer system that can be employed to implement elements of the systems and methods described and illustrated herein, including, for example, aspects of the system depicted in FIG. 1 or the cove lighting structure of FIGS. 2-4.

FIG. 5 is a block diagram of an example computer system 500. The computer system or computing device 500 can include or be used to implement the computing device 101, light fixture 104, or its components. The computer system 500 includes at least one bus 505 or other communication component for communicating information and at least one processor 510 or processing circuit coupled to the bus 505 for processing information. The computer system 500 can also include one or more processors 510 or processing circuits coupled to the bus for processing information. The computer system 500 also includes at least one main memory 515, such as a random access memory (RAM) or other dynamic storage device, coupled to the bus 505 for storing information, and instructions to be executed by the processor 510. The main memory 515 can also be used for storing position information, utility grid data, command instructions, device status information, environmental information within or external to the utility grid, information on characteristics of electricity, or other information during execution of instructions by the processor 510. The computer system 500 may further include at least one read only memory (ROM) 520 or other static storage device coupled to the bus 505 for storing static information and instructions for the processor 510. A storage device 525, such as a solid state device, magnetic disk or optical disk, can be coupled to the bus 505 to persistently store information and instructions.

The computer system 500 may be coupled via the bus 505 to a display 535, such as a liquid crystal display, or active matrix display, for displaying information to a user such as an administrator of the data processing system or the utility grid. An input device 530, such as a keyboard or voice interface may be coupled to the bus 505 for communicating information and commands to the processor 510. The input device 530 can include a touch screen display 535. The input device 530 can also include a cursor control, such as a mouse, a trackball, or cursor direction keys, for communicating direction information and command selections to the processor 510 and for controlling cursor movement on the display 535. The display 535 can be part of the computing device 101, or other components of FIG. 1.

The processes, systems and methods described herein can be implemented by the computer system 500 in response to the processor 510 executing an arrangement of instructions contained in main memory 515. Such instructions can be read into main memory 515 from another computer-readable medium, such as the storage device 525. Execution of the arrangement of instructions contained in main memory 515 causes the computer system 500 to perform the illustrative processes described herein. One or more processors in a multi-processing arrangement may also be employed to execute the instructions contained in main memory 515. Hard-wired circuitry can be used in place of or in combination with software instructions together with the systems and methods described herein. Systems and methods described herein are not limited to any specific combination of hardware circuitry and software.

FURTHER EXAMPLES

The following examples pertain to further embodiments, from which numerous permutations and configurations will be apparent.

Example 1 includes a cove lighting structure, comprising: a return air structure comprising a vent configured to receive return air; a cove structure connected with a platform extended laterally from the return air structure; and a light fixture comprising a light source configured to provide cove lighting, wherein the light fixture is positioned above the platform and between the cove structure and the return air structure.

Example 2 includes the subject matter of Example 1, wherein the vent of the return air structure directs the return air towards a heating, ventilation, or air condition system.

Example 3 includes the subject matter of any one of Examples 1 and 2, wherein the return air structure is positioned to dissipate heat from the light source.

Example 4 includes the subject matter of any one of Examples 1 through 3, wherein the return air structure comprises a plurality of slots to form a plurality of vents.

Example 5 includes the subject matter of any one of Examples 1 through 4, wherein the return air structure comprises a height that is less than a height of the light fixture.

Example 6 includes the subject matter of any one of Examples 1 through 5, comprising: a second return air structure separated from the return air structure by a predetermined distance.

Example 7 includes the subject matter of any one of Examples 1 through 6, wherein the cove structure is mechanically connected to a ceiling.

Example 8 includes the subject matter of any one of Examples 1 through 7, wherein the cove structure is formed from an extrusion of one or more metals.

Example 9 includes the subject matter of any one of Examples 1 through 8, wherein the light source is positioned to direct light towards a surface of at least one of a ceiling or a wall.

Example 10 includes the subject matter of any one of Examples 1 through 9, wherein the light fixture comprises an optical window that directs light at least 180 degrees.

Example 11 includes the subject matter of any one of Examples 1 through 10, wherein the light source is electrically connected to a backup battery system.

Example 12 includes the subject matter of any one of Examples 1 through 11, wherein the light source is closer to a wall of the cove structure relative to the return air structure, and the light source is separated from the return air structure by a predetermined distance.

Example 13 includes an apparatus, comprising: a return air structure comprising a vent configured to receive return air; a cove structure connected with a platform extended laterally from the return air structure; and a light fixture comprising a light source configured to provide cove lighting, wherein the light fixture is positioned above the platform and between the cove structure and the return air structure.

Example 14 includes the subject matter of Example 13, wherein the return air structure comprises a plurality of slots to form a plurality of vents.

Example 15 includes the subject matter of any one of Examples 13 and 14, comprising a second return air structure separated from the return air structure by a predetermined distance.

Example 16 includes the subject matter of any one of Examples 13 through 15, wherein the cove structure is formed from an extrusion of one or more metals.

Example 17 includes the subject matter of any one of Examples 13 through 16, wherein the light fixture comprises an optical window that directs light at least 180 degrees.

Example 18 includes a method, comprising: providing a cove lighting structure, the cove lighting structure comprising: a return air structure comprising a vent configured to receive return air; a cove structure connected with a platform extended laterally from the return air structure; and a light fixture comprising a light source configured to provide cove lighting, wherein the light fixture is positioned above the platform and between the cove structure and the return air structure.

Example 19 includes the subject matter of Example 18, comprising: mechanically connecting the return air structure to direct the return air towards a heating, ventilation, or air condition system.

Example 20 includes the subject matter of any one of Examples 18 and 19, comprising: coupling the cove lighting structure to a ceiling or a wall.

Although an example system has been described in FIG. 1, the subject matter including the operations described in this specification can be implemented in other types of digital electronic circuitry, or in computer software, firmware, or hardware, including the structures disclosed in this specification and their structural equivalents, or in combinations of one or more of them.

Some of the descriptions herein emphasize the structural independence of the aspects of the system components (e.g., arbitration component) and illustrate one grouping of operations and responsibilities of these system components. Other groupings that execute similar overall operations are understood to be within the scope of the present application. Modules can be implemented in hardware or as computer instructions on a non-transient computer-readable storage medium, and modules can be distributed across various hardware- or computer-based components.

The systems described above can provide multiple ones of any or each of those components and these components can be provided on either a standalone system or on multiple instantiation in a distributed system. In addition, the systems and methods described above can be provided as one or more computer-readable programs or executable instructions embodied on or in one or more articles of manufacture. The article of manufacture can be cloud storage, a hard disk, a CD-ROM, a flash memory card, a PROM, a RAM, a ROM, or a magnetic tape. In general, the computer-readable programs can be implemented in any programming language, such as LISP, PERL, C, C++, C#, PROLOG, or in any byte code language such as JAVA. The software programs or executable instructions can be stored on or in one or more articles of manufacture as object code.

Example and non-limiting module implementation elements include sensors providing any value determined herein, sensors providing any value that is a precursor to a value determined herein, datalink or network hardware including communication chips, oscillating crystals, communication links, cables, twisted pair wiring, coaxial wiring, shielded wiring, transmitters, receivers, or transceivers, logic circuits, hard-wired logic circuits, reconfigurable logic circuits in a particular non-transient state configured according to the module specification, any actuator including at least an electrical, hydraulic, or pneumatic actuator, a solenoid, an op-amp, analog control elements (springs, filters, integrators, adders, dividers, gain elements), or digital control elements.

The subject matter and the operations described in this specification can be implemented in digital electronic circuitry, or in computer software, firmware, or hardware, including the structures disclosed in this specification and their structural equivalents, or in combinations of one or more of them. The subject matter described in this specification can be implemented as one or more computer programs, e.g., one or more circuits of computer program instructions, encoded on one or more computer storage media for execution by, or to control the operation of, data processing apparatuses. Alternatively or in addition, the program instructions can be encoded on an artificially generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. While a computer storage medium is not a propagated signal, a computer storage medium can be a source or destination of computer program instructions encoded in an artificially generated propagated signal. The computer storage medium can also be, or be included in, one or more separate components or media (e.g., multiple CDs, disks, or other storage devices include cloud storage). The operations described in this specification can be implemented as operations performed by a data processing apparatus on data stored on one or more computer-readable storage devices or received from other sources.

The terms "computing device", "component" or "data processing apparatus" or the like encompass various apparatuses, devices, and machines for processing data, including by way of example a programmable processor, a computer, a system on a chip, or multiple ones, or combinations of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, app, script, or code) can be written in any form of programming language, including compiled or interpreted languages, declarative or procedural languages, and can be deployed in any form, including as a stand-alone program or as a module, component, subroutine, object, or other unit suitable for use in a computing environment. A computer program can correspond to a file in a file system. A computer program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatuses can also be implemented as, special purpose logic circuitry, e.g., an FPGA (field programmable gate array) or an ASIC (application specific integrated circuit). Devices suitable for storing computer program instructions and data can include non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

The subject matter described herein can be implemented in a computing system that includes a back end component, e.g., as a data server, or that includes a middleware component, e.g., an application server, or that includes a front end component, e.g., a client computer having a graphical user interface or a web browser through which a user can interact with an implementation of the subject matter described in this specification, or a combination of one or more such back end, middleware, or front end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

While operations are depicted in the drawings in a particular order, such operations are not required to be performed in the particular order shown or in sequential order, and all illustrated operations are not required to be performed. Actions described herein can be performed in a different order.

Having now described some illustrative implementations, it is apparent that the foregoing is illustrative and not limiting, having been presented by way of example. In particular, although many of the examples presented herein involve specific combinations of method acts or system elements, those acts and those elements may be combined in other ways to accomplish the same objectives. Acts, elements and features discussed in connection with one implementation are not intended to be excluded from a similar role in other implementations or implementations.

The phraseology and terminology used herein is for the purpose of description and should not be regarded as limiting. The use of "including" "comprising" "having" "containing" "involving" "characterized by" "characterized in that" and variations thereof herein, is meant to encompass the items listed thereafter, equivalents thereof, and additional items, as well as alternate implementations consisting of the items listed thereafter exclusively. In one implementation, the systems and methods described herein consist of one, each combination of more than one, or all of the described elements, acts, or components.

Any references to implementations or elements or acts of the systems and methods herein referred to in the singular may also embrace implementations including a plurality of these elements, and any references in plural to any implementation or element or act herein may also embrace implementations including only a single element. References in the singular or plural form are not intended to limit the presently disclosed systems or methods, their components, acts, or elements to single or plural configurations. References to any act or element being based on any information, act or element may include implementations where the act or element is based at least in part on any information, act, or element.

Any implementation disclosed herein may be combined with any other implementation or embodiment, and references to "an implementation," "some implementations," "one implementation" or the like are not necessarily mutually exclusive and are intended to indicate that a particular feature, structure, or characteristic described in connection with the implementation may be included in at least one implementation or embodiment. Such terms as used herein are not necessarily all referring to the same implementation. Any implementation may be combined with any other implementation, inclusively or exclusively, in any manner consistent with the aspects and implementations disclosed herein.

References to "or" may be construed as inclusive so that any terms described using "or" may indicate any of a single, more than one, and all of the described terms. For example, a reference to "at least one of 'A' and 'B'" can include only 'A', only 'B', as well as both 'A' and 'B'. Such references used in conjunction with "comprising" or other open terminology can include additional items.

Where technical features in the drawings, detailed description or any claim are followed by reference signs, the reference signs have been included to increase the intelligibility of the drawings, detailed description, and claims. Accordingly, neither the reference signs nor their absence have any limiting effect on the scope of any claim elements.

Modifications of described elements and acts such as variations in sizes, dimensions, structures, shapes and proportions of the various elements, values of parameters, mounting arrangements, use of materials, colors, orientations can occur without materially departing from the teachings and advantages of the subject matter disclosed herein. For example, elements shown as integrally formed can be constructed of multiple parts or elements, the position of elements can be reversed or otherwise varied, and the nature or number of discrete elements or positions can be altered or varied. Other substitutions, modifications, changes and omissions can also be made in the design, operating conditions and arrangement of the disclosed elements and operations without departing from the scope of the present disclosure.

The systems and methods described herein may be embodied in other specific forms without departing from the characteristics thereof. Scope of the systems and methods described herein is thus indicated by the appended claims, rather than the foregoing description, and changes that come within the meaning and range of equivalency of the claims are embraced therein.

While this specification contains many specific implementation details, these should not be construed as limitations on the scope of any inventions or of what can be claimed, but rather as descriptions of features specific to particular embodiments of particular aspects. Certain features described in this specification in the context of separate embodiments can also be implemented in combination in a single embodiment. Conversely, various features described in the context of a single embodiment can also be implemented in multiple embodiments separately or in any suitable subcombination. Moreover, although features can be described above as acting in certain combinations and even initially claimed as such, one or more features from a claimed combination can in some cases be excised from the combination, and the claimed combination can be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing can be advantageous. Moreover, the separation of various system components in the embodiments described above should not be understood as requiring such separation in all embodiments, and it should be understood that the described program components and systems can generally be integrated in a single software product or packaged into multiple software products.

Thus, particular embodiments of the subject matter have been described. In some cases, the actions recited in the claims can be performed in a different order and still achieve desirable results. In addition, the processes depicted in the accompanying figures do not necessarily require the particular order shown, or sequential order, to achieve desirable results.

What is claimed is:

1. A cove lighting structure, comprising:

a cove structure that extends along at least a portion of a length of the cove lighting structure, wherein at least a portion of the cove structure is located at a first side of a width of the cove lighting structure;

a return air structure configured for air to move through the return air structure via a return air system, wherein a portion of the return air structure is located at a second side of the width;

a platform of the cove structure configured to extend along at least a second portion of the length, wherein the platform comprises a first surface and a second surface, the first surface comprising a portion for installation of the cove lighting structure onto a surface external to the cove lighting structure; and a light fixture supported by the second surface of the platform and configured to extend along at least a third portion of the length and direct light toward at least one of a ceiling or a wall, wherein the light fixture is located between the portion of the cove structure at the first side of the width and the portion of the return air structure at the second side of the width.

2. The cove lighting structure of claim 1, wherein the return air structure is coupled with the cove structure via the platform, the length is oriented laterally with respect to the return air structure, and the length is greater than the width.

3. The cove lighting structure of claim 1, wherein the light fixture is configured to extend laterally from the return air structure, and the light fixture comprises a light module comprising a light source, the light module configured to couple with the light fixture via a second coupling mechanism.

4. The cove lighting structure of claim 1, wherein the second surface of the platform comprises a coupling mechanism to couple with the light fixture, the coupling mechanism to position the light fixture along the length and adjust a direction of light emitted from a light source of the light fixture toward at least one of the ceiling or the wall.

5. The cove lighting structure of claim 1, wherein the return air structure is separate from a side of the light fixture by a gap to provide a path for the air to move through the return air structure to dissipate heat from a light source of the light fixture.

6. The cove lighting structure of claim 1, wherein the return air structure comprises a vent located at the second side of the width, the vent configured for air to move through the vent via the return air system.

7. The cove lighting structure of claim 6, wherein the return air structure comprises a second vent for moving the air via the return air system, the second vent located at the second side of the width and spaced from the vent along the length of the cove lighting structure.

8. The cove lighting structure of claim 1, wherein the portion of the return air structure comprises a height of the return air structure along a height of the cove lighting structure, wherein the height of the return air structure is greater than a height of the light fixture along the height of the cove lighting structure, wherein the height of the cove lighting structure is perpendicular to the length and to the width.

9. The cove lighting structure of claim 1, wherein the light fixture is an independent component configured to couple with the cove lighting structure via the platform.

10. The cove lighting structure of claim 1, wherein the return air structure directs the air towards at least one of the return air system or away from the return air system.

11. The cove lighting structure of claim 1, wherein the return air system comprises at least one of a heating system, a ventilation system, or an air conditioning system.

12. The cove lighting structure of claim 1, wherein the external surface is a surface of a second wall that is one of adjacent to, or facing towards, at least one of the wall or the ceiling.

13. The cove lighting structure of claim 1, wherein the cove structure is formed from an extrusion of one or more metals.

14. The cove lighting structure of claim 1, wherein the light fixture comprises an optical window that covers a light source for emitting the light and directs the light emitted by the light source at least 180 degrees and wherein at least the second portion of the length and the third portion of the length comprise at least the portion of the length.

15. An apparatus, comprising:

a cove structure of a cove lighting structure that extends along at least a portion of a length of the cove lighting structure, wherein at least a portion of the cove structure is located at a first side of a width of the cove lighting structure;

a return air structure configured for air to move via a return air system, wherein a portion of the return air structure is located at a second side of the width;

a platform of the cove structure configured to extend along at least a second portion of the length, wherein the platform comprises a first surface and a second surface, the first surface comprising a portion for installation of the cove lighting structure onto a surface external to the cove lighting structure;

a light fixture supported by the second surface of the platform and configured to extend along at least a third portion of the length and direct light toward at least one of a ceiling or a wall, wherein the light fixture is located between the portion of the cove structure at the first side of the width and the portion of the return air structure at the second side of the width.

16. The apparatus of claim 15, wherein the return air structure is coupled with the cove structure via the platform, the length is oriented laterally with respect to the return air structure and the length is greater than the width.

17. The apparatus of claim 15, wherein the light fixture is configured to extend laterally from the return air structure, and the light fixture comprises a light module comprising a light source, the light module configured to couple with the light fixture via a second coupling mechanism.

18. The apparatus of claim 15, wherein the second surface of the platform comprises a coupling mechanism to couple with the light fixture, the coupling mechanism to position the light fixture along the length and adjust a direction of light emitted from a light source of the light fixture toward at least one of the ceiling or the wall.

19. A method, comprising:

providing a cove lighting structure, the cove lighting structure comprising:

a cove structure that extends along at least a portion of a length of the cove lighting structure, wherein at least a portion of the cove structure is located at a first side of a width of the cove lighting structure;

a return air structure configured for air to move via a return air system, wherein a portion of the return air structure is located at a second side of the width; and a platform of the cove structure configured to extend along at least a second portion of the length, wherein the platform comprises a first surface and a second surface, the first surface comprising a portion for installation of the cove lighting structure onto a surface external to the cove lighting structure; and supporting, by the second surface of the platform, a light fixture configured to extend along at least a third portion of the length and direct light toward at least one of a ceiling or a wall, wherein the light fixture is located between the portion of the cove structure at the first side of the width and portion of the return air structure at the second side of the width.

20. The method of claim 19, comprising:

installing the cove lighting structure via the portion for installation, to the surface external to the cove, wherein the surface external to the cove is a surface of a second wall that is one of adjacent to or facing one of the ceiling or the wall.

* * * * *